United States Patent
Peng et al.

(10) Patent No.: US 11,606,747 B2
(45) Date of Patent: Mar. 14, 2023

(54) ENERGY SAVING METHOD AND APPARATUS, AND COMPUTER-READABLE STORAGE MEDIUM

(71) Applicant: HUAWEI TECHNOLOGIES CO., LTD., Guangdong (CN)

(72) Inventors: Jindong Peng, Chengdu (CN); Wei Zhang, Chengdu (CN)

(73) Assignee: Huawei Technologies Co., Ltd., Guangdong (CN)

( * ) Notice: Subject to any disclaimer, the term of this patent is extended or adjusted under 35 U.S.C. 154(b) by 210 days.

(21) Appl. No.: 17/156,987

(22) Filed: Jan. 25, 2021

(65) Prior Publication Data
US 2021/0144636 A1    May 13, 2021

Related U.S. Application Data

(63) Continuation of application No. PCT/CN2018/097117, filed on Jul. 25, 2018.

(51) Int. Cl.
H04W 52/02      (2009.01)
H04W 24/08      (2009.01)

(52) U.S. Cl.
CPC ....... H04W 52/0206 (2013.01); H04W 24/08 (2013.01)

(58) Field of Classification Search
CPC .. H04W 52/0206; H04W 24/08; Y02D 10/00; Y02D 30/70
See application file for complete search history.

(56) References Cited

U.S. PATENT DOCUMENTS 9,713,009 B2 *    7/2017    Acharya .............. H04W 24/02
2013/0272132 A1 *  10/2013   Heo .................. H04W 28/0268
                                                    370/236.2
(Continued)

FOREIGN PATENT DOCUMENTS

CN    102256346 A    11/2011
CN    102625451 A     8/2012
(Continued)

OTHER PUBLICATIONS

PCT International Search Report and Written Opinion issued in International Application No. PCT/CN2018/097117 dated Apr. 26, 2019, 17 pages (with English translation).
(Continued)

Primary Examiner — Margaret G Mastrodonato
Assistant Examiner — Nicole M Louis-Fils
(74) Attorney, Agent, or Firm — Fish & Richardson P.C.

(57) ABSTRACT

A centralized controller determines n radio remote units (RRUs) in m RRUs, where a sum of first downlink reference signal received powers (RSRPs) of a same terminal, corresponding to the n RRUs, is greater than or equal to a first preset value, and a first downlink RSRP of one terminal corresponding to one is a received power that is estimated by the centralized controller, that is measured by the terminal, and that is of a reference signal (RS) from the RRU at a corresponding first RS transmit power. The centralized controller turns off an RRU that is in the m RRUs and that is different from the n RRUs, boosts a second RS transmit power corresponding to each of the n RRUs to a corresponding first RS transmit power, and enables each of the n RRUs to send an RS at the corresponding first RS transmit power.

20 Claims, 5 Drawing Sheets

(56) References Cited

U.S. PATENT DOCUMENTS

| | | | | |
|---|---|---|---|---|
| 2014/0094169 A1* | 4/2014 | Takano | ................... | H04L 5/005 455/434 |
| 2017/0063486 A1 | 3/2017 | Sarashina | | |
| 2018/0013529 A1* | 1/2018 | You | ....................... | H04L 12/189 |

FOREIGN PATENT DOCUMENTS

| | | |
|---|---|---|
| CN | 103298096 A | 9/2013 |
| CN | 103458455 A | 12/2013 |
| CN | 103906153 A | 7/2014 |
| CN | 104969607 A | 10/2015 |
| CN | 105519205 A | 4/2016 |
| EP | 2536221 A1 | 12/2012 |
| JP | 2013021379 A | 1/2013 |
| JP | 2016111716 A | 6/2016 |
| JP | 2017046050 A | 3/2017 |
| WO | 2011103186 A2 | 8/2011 |
| WO | 2013143386 A1 | 10/2013 |
| WO | 2014059799 A1 | 4/2014 |
| WO | 2016139880 A1 | 9/2016 |
| WO | 2017070635 A1 | 4/2017 |
| WO | 2018017468 A1 | 1/2018 |
| WO | 2018094746 A1 | 5/2018 |

OTHER PUBLICATIONS

Office Action issued in Chinese Application No. 201880095883.5 dated Nov. 2, 2021, 5 pages.

Office Action issued in Japanese Application No. 2021-503922 dated Apr. 25, 2022, 13 pages (with English translation).

Extended European Search Report issued in European Application No. 18927962.3 dated Jun. 10, 2021, 8 pages.

* cited by examiner

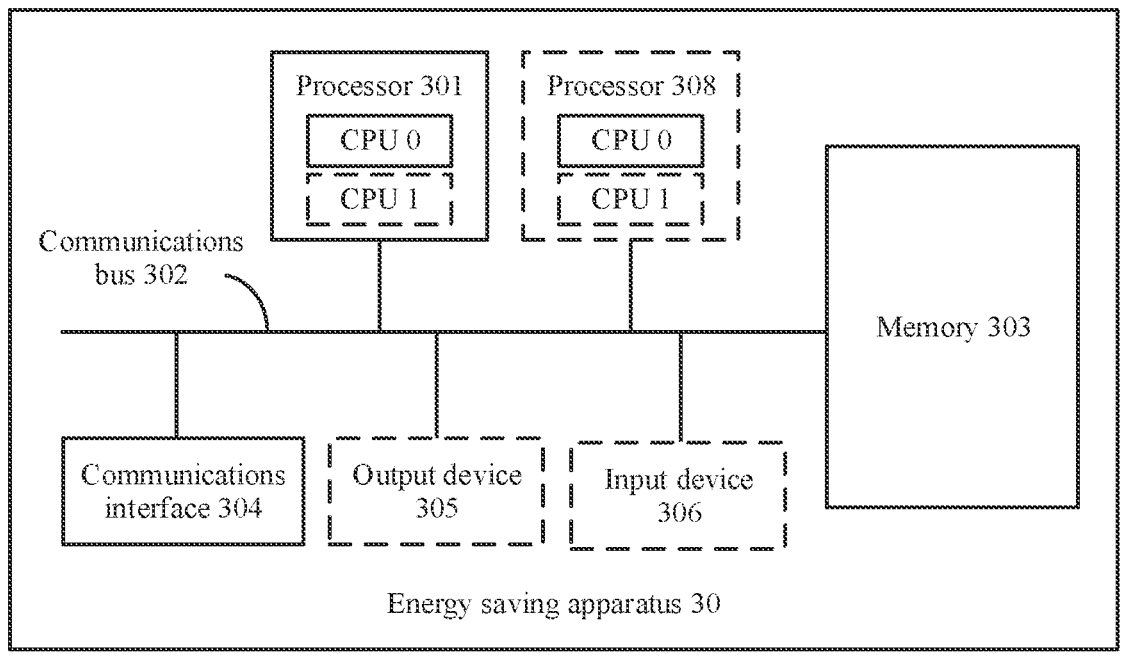

FIG. 3

A centralized controller determines n RRUs in m RRUs, where a sum of first downlink RSRPs, of a same terminal, corresponding to the n RRUs is greater than or equal to a first preset value, one RRU corresponds to first downlink RSRPs of a plurality of terminals, a first downlink RSRP, of one terminal, corresponding to one RRU is a received power that is estimated by the centralized controller, that is measured by the terminal, and that is of an RS sent by the RRU at a corresponding first RS transmit power, a first RS transmit power corresponding to one RRU is an RS transmit power obtained after power boosting is performed on a second RS transmit power corresponding to the RRU, second RS transmit powers corresponding to the m RRUs are all preconfigured, the first preset value is a level value to be reached when the plurality of terminals perform a downlink service, and n is an integer greater than 0 and less than m ⟶ 401

The centralized controller turns off an RRU that is in the m RRUs and that is different from the n RRUs ⟶ 402

The centralized controller boosts a second RS transmit power corresponding to each of the n RRUs to a corresponding first RS transmit power, and enables each of the n RRUs to send an RS at the corresponding first RS transmit power ⟶ 403

FIG. 4

ENERGY SAVING METHOD AND APPARATUS, AND COMPUTER-READABLE STORAGE MEDIUM

CROSS-REFERENCE TO RELATED APPLICATION

This application is a continuation of International Application No. PCT/CN2018/097117, filed on Jul. 25, 2018. The disclosure of the aforementioned application is hereby incorporated in its entirety.

TECHNICAL FIELD

This application relates to the field of communications technologies, and in particular, to an energy saving method and apparatus, and a computer-readable storage medium.

BACKGROUND

A distributed pico base station (LampSite) is configured to provide indoor network coverage. Different from a conventional base station (a base station including a baseband processing unit (BBU) and a remote radio unit (RRU)), the LampSite adopts a BBU+rHub+pRRU architecture, to reduce costs and improve network coverage. To be specific, the LampSite architecture includes one BBU and a plurality of pRRUs, and the plurality of pRRUs are connected to the BBU through the rHub. Hub represents a wireless hub, r represents an RRU, and the rHub represents a hub connected to the RRU, p in the pRRU represents pica. Generally, an indoor area of a medium or large-sized building reaches 20,000 to 50,000 square meters, or even 100,000 square meters. To implement network coverage over such a large area, dozens or hundreds of pRRUs are needed in the LampSite architecture. Because a quantity of the pRRUs is relatively large, large power consumption is caused when the plurality of pRRUs run for a long time.

SUMMARY

Embodiments of this application provide an energy saving method and apparatus, and a computer-readable storage medium, to reduce power consumption of a LampSite, According to a first aspect, an energy saving method is provided. The energy saving method is applied to a communications system, where the communications system includes a centralized controller and m RRUs connected to the centralized controller, m is an integer greater than 1. The energy saving method includes: The centralized controller determines n RRUs in the nor RRUs. A sum of first downlink RSRPs, of a same terminal, corresponding to the n RRUs is greater than or equal to a first preset value. One RRU corresponds to first downlink RSRPs of a plurality of terminals. A first downlink RSRP, of one terminal, corresponding to one RRU is a received power that is estimated by the centralized controller, that is measured by the terminal, and that is of an RS sent by the RRU at a corresponding first RS transmit power. A first RS transmit power corresponding to one RRU is an RS transmit power obtained after power boosting is performed on a second RS transmit power corresponding to the RRU. Second RS transmit powers corresponding to the m RRUs are all preconfigured. The first preset value is a level value to he reached when the plurality of terminals perform a downlink service. n is an integer greater than 0 and less than m. The centralized controller turns off an RRU that is in the in RRUs and that is different from the n RRUs. The centralized controller boosts a second RS transmit power corresponding to each of the n RRUs to a corresponding first RS transmit power, and enables each of then RRUs to send an RS at the corresponding first RS transmit power. According to the method provided in the first aspect, the RS transmit power of the RRU is boosted, so that the n RRUs in the m RRUs can satisfy a downlink coverage requirement of a cell. Therefore, the RRU that is in the in RRUs and that is different from the n RRUs can be turned off, to reduce power consumption of the communications system. According to the method provided in the first aspect, the downlink coverage requirement of the cell is satisfied, and network KPI performance is also ensured.

In a possible implementation, that the centralized controller boosts a second RS transmit power corresponding to each of the n RRUs to a corresponding first RS transmit power includes: The centralized controller reduces a data transmit power, and increases the RS transmit power, to boost the second RS transmit power corresponding to each of the n RRUs to the corresponding first RS transmit power. Alternatively, The centralized controller concentrates a total RS transmit power on a service bandwidth of a logical cell to which the RRU belongs, to a bandwidth in a middle of the service bandwidth, to boost the second RS transmit power corresponding to each of the n RRUs to the corresponding first RS transmit power. In this possible implementation, a plurality of manners of boosting the RS transmit power of the RRU are provided, so that the method provided in the embodiments of this application has more implementation possibilities.

In a possible implementation, before that the centralized controller determines n RRUs in the m RRUs, the energy saving method further includes: The centralized controller determines second downlink RSRPs, of the plurality of terminals, corresponding to each of the m RRUs. A second downlink RSRP, of one terminal, corresponding to one RRU is a received power that is measured by the terminal and that is of an RS sent by the RRU at a corresponding second RS transmit power. The centralized controller determines a boosted RS transmit power of each of the m RRUs. The centralized controller determines first downlink RSRPs, of the plurality of terminals, corresponding to each of them RRUs, based on the second downlink RSRPs, of the plurality of terminals, corresponding to each of the m RRUs and the boosted RS transmit power of each RRU. In this possible implementation, a manner of obtaining the first downlink RSRP of the RRU is provided.

In a possible implementation, before that the centralized controller concentrates a total RS transmit power on a service bandwidth of a logical cell to which the RRU belongs, to a bandwidth in a middle of the service bandwidth, to boost the second RS transmit power corresponding to each of the n RRUs to the corresponding first RS transmit power, the energy saving method further includes: The centralized controller determines, based on a boosted. RS transmit power of each of then RRUs, the bandwidth in the middle corresponding to then RRUs. In this possible implementation, a manner of determining the bandwidth in the middle is provided.

In a possible implementation, that the centralized controller determines a second downlink RSRP, of a first terminal, corresponding to a first RRU in the m RRUs includes: The centralized controller measures uplink RSRPs, of the first terminal, corresponding to the m RRUs. An uplink RSRP, of the first terminal, corresponding to one RRU is a received power that is measured by the centralized controller and that is of an SRS sent by the first terminal through the RRU. The first terminal is any one of the plurality of terminals. The centralized controller receives information that is sent by the first terminal and that is about a sum of second downlink RSRPs, of the first terminal, corresponding to the m RRUs. The centralized controller determines the second downlink RSRP, of the first terminal, corresponding to the first RRU, based on the uplink RSRPs, of the first terminal, corresponding to the m RRUs and the information about the sum of the second downlink RSRPs, of the first terminal, corresponding to the m RRUs. The first RRU is any one of the m RRUs. In this possible implementation, a manner of obtaining the second downlink RSRP of the RRU is provided.

In a possible implementation, that the centralized controller, determines the second downlink RSRP, of the first terminal, corresponding to the first RRU, based on the uplink RSRPs, of the first terminal, corresponding to the m RRUs and the information about the sum of the second downlink RSRPs, of the first terminal, corresponding to the m RRUs includes: The centralized controller determines, based on a preset algorithm, a linear value of the second downlink RSRP, of the first terminal, corresponding to the first RRU. The preset algorithm is $$\frac{S_{uplink\ RSRP}}{RSRP1'} = \frac{S_{downlink\ RSRP}}{RSRP1},$$

$S_{uplink\ RSRP}$ is a sum of linear values of the uplink RSRPs, of the first terminal, corresponding to the m RRUs. $S_{downlink\ RSRP}$ is a sum of linear values of the second downlink RSRPs, of the first terminal, corresponding to the m RRUs, RSRP1' is a linear value of an uplink RSRP, of the first terminal, corresponding to the first RRU, and RSRP1 is the linear value of the second downlink RSRP, of the first terminal, corresponding to the first RRU. The centralized controller determines the second downlink RSRP, of the first terminal, corresponding to the first RRU, based on the linear value of the second downlink RSRP, of the first terminal, corresponding to the first RRU. In this possible implementation, a manner of determining the second downlink RSRP of the RRU is provided.

In a possible implementation, that the centralized controller determines n RRUs in the m RRUs includes: The centralized controller determines whether a sum of first downlink RSRPs, of each of the plurality of terminals, corresponding to any j RRUs in the m RRUs is greater than or equal to a first preset value; and if yes, the centralized controller determines the j RRUs as the n RRUs; or if not, the centralized controller assigns j=j+1, and continues to determine whether a sum of first downlink RSRPs, of each of the plurality of terminals, corresponding to any j RRUs in the m RRUs is greater than or equal to the first preset value, until the n RRUs are determined. An initial value of j is a preset value. In this possible implementation, then RRUs in the in RRUs are determined by using the preset value as the initial value, so that a quantity of the determined n RRUs can be as small as possible. This further reduces the power consumption of the communications system.

In a possible implementation, before that the centralized controller determines n RRUs in the m RRUs, the energy saving method further includes: The centralized controller determines to enter an energy saving mode. In this possible implementation, the centralized controller may perform the foregoing method when determining to enter the energy saving mode, so as to reduce the power consumption of the communications system when the communications system needs to save energy.

According to a second aspect, an energy saving apparatus is provided. The energy saving apparatus is located in a communications system, where the communications system further includes in RRUs connected to the energy saving apparatus, and m is an integer greater than 1. The energy saving apparatus includes a processing unit. The processing unit is configured to determine n RRUs in the in RRUs. A sum of first downlink RSRPs, of a same terminal, corresponding to the n RRUs is greater than or equal to a first preset value. One RRU corresponds to first downlink RSRPs of a plurality of terminals. A first downlink RSRP, of one terminal, corresponding to one RRU is a received power that is estimated by the energy saving apparatus, that is measured by the terminal, and that is of an RS sent by the RRU at a corresponding first RS transmit power, A first RS transmit power corresponding to one. RRU is an RS transmit power obtained after power boosting is performed on a second RS transmit power corresponding to the RRU. Second RS transmit powers corresponding to the m RRUs are all preconfigured. The first preset value is a level value to be reached when the plurality of terminals perform a downlink service, n is an integer greater than 0 and less than m. The processing unit is further configured to turn off an RRU that is in the m RRUs and that is different from the n RRUs. The processing unit is further configured to: boost a second RS transmit power corresponding to each of the n RRUs to a corresponding first RS transmit power, and enable each of the n RRUs to send an RS at the corresponding first RS transmit power.

In a possible implementation, the processing unit is specifically configured to: reduce a data transmit power, and increase an RS transmit power, to boost the second RS transmit power corresponding to each of the n RRUs to the corresponding first RS transmit power; or concentrate a total RS transmit power on a service bandwidth of a logical cell to which the RRU belongs, to a bandwidth in a middle of the service bandwidth, to boost the second RS transmit power corresponding to each of the n RRUs to the corresponding first RS transmit power.

In a possible implementation, the processing unit is further configured to: determine second downlink RSRPs, of the plurality of terminals, corresponding to each of the m RRUs, where a second downlink RSRP, of one terminal, corresponding to one RRU is a received power that is measured by the terminal and that is of an RS sent by the RRU at a corresponding second RS transmit power; determine a boosted RS transmit power of each of the m RRUs; and determine first downlink RSRPs, of the plurality of terminals, corresponding to each of the m RRUs, based on the second downlink RSRPs, of the plurality of terminals, corresponding to each of the m RRUs and the boosted RS transmit power of each RRU.

In a possible implementation, the processing unit is further configured to determine, based on a boosted RS transmit power of each of the n RRUs, the bandwidth in the middle corresponding to the n RRUs.

In a possible implementation, the energy saving apparatus further includes a communications unit. The processing unit is specifically configured to: measure uplink RSRPs, of the first terminal, corresponding to the m RRUs, where an uplink RSRP, of the first terminal, corresponding to one RRU is a received power that is measured by the energy saving apparatus and that is of an SRS sent by the first terminal through the RRU, and the first terminal is any one of the plurality of terminals; receive, through the communications unit, information that is sent by the first terminal and that is about a sum of second downlink RSRPs, of the first terminal, corresponding to the m RRUs; and determine a second downlink RSRP, of the first terminal, corresponding to the first RRU, based on the uplink RSRPs, of the first terminal, corresponding to them RRUs and the information about the sum of the second downlink RSRPs, of the first terminal, corresponding to the m RRUs, where the first RRU is any one of the m RRUs.

In a possible implementation, the processing unit is specifically configured to: determine, based on a preset algorithm, a linear value of the second downlink RSRP, of the first terminal, corresponding to the first RRU, where the preset algorithm is $$\frac{S_{uplink\_RSRP}}{RSRP1'} = \frac{S_{downlink\_RSRP}}{RSRP1},$$

$S_{uplink\_RSRP}$ is a sum of linear values of the uplink RSRPs, of the first terminal, corresponding to the m RRUs, $S_{downlink\_RSRP}$ is a sum of linear values of the second downlink RSRPs, of the first terminal, corresponding to the m RRUs, RSRP1' is a linear value of an uplink RSRP, of the first terminal, corresponding to the first RRU, and RSRP1 is the linear value of the second downlink RSRP, of the first terminal, corresponding to the first RRU; and determine the second downlink RSRP, of the first terminal, corresponding to the first RRU, based on the linear value of the second downlink RSRP, of the first terminal, corresponding to the first RRU.

In a possible implementation, the processing unit is specifically configured to: determine whether a sum of first downlink RSRPs, of each of the plurality of terminals, corresponding to any j RRUs in the m RRUs is greater than or equal to a first preset value and if yes, determine the j RRUs as the n RRUs; or if not, assign j=j+1, and continue to determine whether a sum of first downlink RSRPs, of each of the plurality of terminals, corresponding to any j RRUs in the m RRUs is greater than or equal to the first preset value, until the n RRUs are determined. An initial value of j is a preset value.

In a possible implementation, the processing unit is further configured to determine to enter an energy saving mode.

According to a third aspect, an energy saving apparatus is provided. The energy saving apparatus includes: a memory, a processor, and a communications bus. The memory is configured to store a computer-executable instruction. The processor is connected to the memory through the communications bus. The processor executes the computer-executable instruction stored in the memory, to enable the apparatus to implement any method provided in the first aspect. The apparatus may exist in a product form of a chip.

According to a fourth aspect, a computer-readable storage medium is provided. The computer-readable storage medium includes an instruction. When the instruction is run on a computer, the computer is enabled to perform any method provided in the first aspect.

According to a fifth aspect, a computer program product including an instruction is provided. When the computer program product runs on a computer, the computer is enabled to perform any method provided in the first aspect.

For beneficial effects of the implementations in any one of the second aspect to the fifth aspect, refer to the technical effects brought by the corresponding implementations provided in the first aspect. Details are not described herein again.

BRIEF DESCRIPTION OF DRAT DRAWINGS

FIG. 3 is a schematic structural diagram of hardware of an energy saving apparatus according to an embodiment of this application;

FIG. 4 is a flowchart of an energy saving method according to an embodiment of this application;

DESCRIPTION OF EMBODIMENTS

The following describes technical solutions in embodiments of this application with reference to the accompanying drawings in the embodiments of this application. In descriptions of this application, "/" means "or" unless otherwise specified. For example, A/B may represent A or B. The term "and/or" in this specification describes only an association relationship for describing associated objects and represents that three relationships may exist. For example, A and/or B may represent the following three cases: Only A exists, both A and B exist, and only B exists. In addition, "a plurality of" means two or more than two. The terms such as "first" and "second" do not constitute a limitation on a quantity or an execution sequence, and the terms such as "first" and "second" do not indicate a definite difference.

The technical solutions in the embodiments of this application may be applied to various communications systems, for example, a global system for mobile communications (GSM), an evolved universal terrestrial radio access (evolved UTRA, E-UTRA), a universal mobile telecommunications system (UMTS), an evolved version of UMTS, long term evolution (LIE) and various versions evolved based on LIE, and a next-generation communications system such as a 5th-generation (5G) communications system or new radio (NR).

For example, a method provided in the embodiments of this application may be applied to a LampSite scenario. Referring to a LampSite architecture shown in FIG. 1, the LampSite architecture includes one BBU and m pRRUs connected to the BBU through an rHub. The m pRRUs belong to a same logical cell. Generally, when a plurality of pRRUs combine to transmit information (for example, combine to transmit data and/or a reference signal (RS)), in other words, when a terminal sends information to the BBU through the plurality of pRRUs, the BBU does not differentiate between the information sent by different pRRUs.

When the BBU sends information to the terminal through the plurality of pRRUs, the terminal does not differentiate between the information sent by different pRRUs. In this case, a centralized controller in the method provided in the embodiments of this application may be the BBU, and an RRU may be the pRRU.

Figure 2:
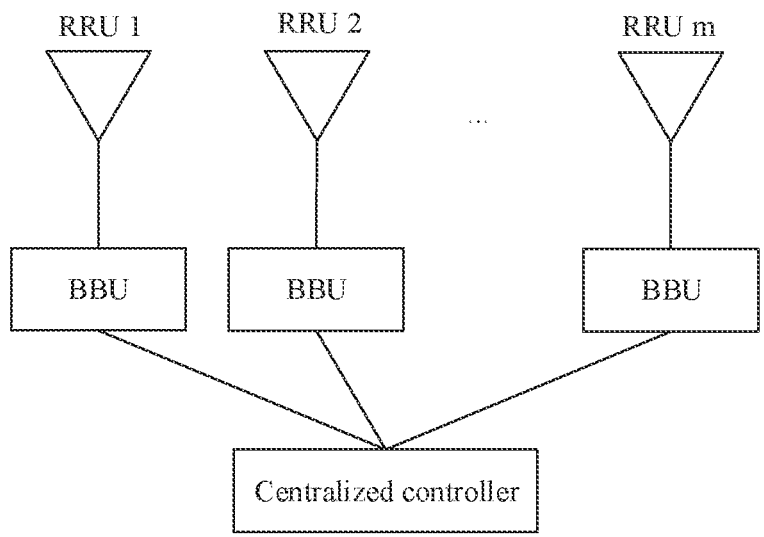
FIG. 2 is a schematic diagram of an application scenario according to an embodiment of this application.

The method provided in the embodiments of this application may be further applied to a scenario shown in FIG. 2. The scenario includes m BBUs, each BBU is connected to one RRU, and each RRU belongs to a different logical cell. In this case, the centralized controller in the method provided in the embodiments of this application may be a centralized control unit configured to control the m BBUs, and may be specifically a BBU in the m BBUs, or may be a centralized control unit different from the m BBUs. The centralized controller may be connected to m RRUs through the m BBUs respectively.

In the LampSite scenario, an energy saving method is as fellows: During light-traffic hours, a pRRU at an entrance/exit or a key gateway of a building is kept powered on, a logical cell to which the pRRU belongs is enabled, and service monitoring is performed in real time. As a user moves, another pRRU is remotely powered on. In this way, a network is enabled when the user comes. When the user leaves an indoor area, the pRRU is powered off In this way, the network is disabled when the user leaves. In LTE standard, because random access is not initiated when a terminal camps on a cell, the terminal may not be detected. If a pRRU in a specific position is improperly selected, the terminal may not be detected either.

An embodiment of this application provides a schematic structural diagram of hardware of an energy saving apparatus 30. As shown in FIG. 3, the energy saving apparatus 30 may be a centralized controller in the following. The energy saving apparatus 30 includes a processor 301, a communications bus 302, a memory 303, and at least one communications interface 304.

The processor 301 may be one or more general-purpose central processing units (CPU), a microprocessor, an application-specific integrated circuit (SIC), or one or more integrated circuits configured to control program execution in the solutions in this application.

The communications bus 302 is used for communication among the foregoing components, to transmit information.

The communications interface 304 may use any apparatus of a transceiver type and is configured to communicate with another device or a communications network, for example, the Ethernet, a radio access network (RAN), a wireless local area network (WLAN).

The memory 303 is configured to store a computer-executable instruction for executing the solutions in this application, and the processor 301 controls the execution. The processor 301 is configured to execute the computer-executable instruction stored in the memory 303, to implement the method provided in the following embodiments of this application, for example, to perform an action of the centralized controller in the following. The memory 303 may be a read-only memory (ROM) or another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray optical disc, or the like), a magnetic disk storage medium or another magnetic storage device, or any other medium that can carry or store expected program code in a firm of an instruction or a data structure and that can be accessed by a computer. However, the memory 303 is not limited thereto. The memory 303 may exist independently and is connected to the processor 301 through the communications bus 302. Alternatively, the memory 303 may be integrated with the processor 301.

Optionally, in this embodiment of this application, the computer-executable instruction may also be referred to as application program code. This is not specifically limited in this embodiment of this application.

In an embodiment, the processor 301 may include one or more CPUs, for example, a CPU 0 and a CPU 1 in FIG. 3.

In an embodiment, the energy saving apparatus 30 may include a plurality of processors, for example, the processor 301 and a processor 308 in FIG. 3. Each of the processors may be a single-core (single-CPU) processor or a multi-core (multi-CPU) processor. The processor herein may refer to one or more devices, circuits, and/or processing cores configured to process data (for example, a computer program instruction).

In an embodiment, the energy saving apparatus 30 may further include an output device 305 and an input device 306. The output device 305 communicates with the processor 301, and may display information in a plurality of manners. The input device 306 communicates with the processor 301, and may receive an input of a user in a plurality of manners.

An embodiment of this application provides an energy saving method, applied to a communications system. The communications system includes a centralized controller and m RRUs connected to the centralized controller, where m is an integer greater than 1. As shown in FIG. 4, the energy saving method includes the following steps.

401: The centralized controller determines n RRUs in the m RRUs, where a sum of first downlink reference signal received powers (RSRP), of a same terminal, corresponding to the n RRUs is greater than or equal to a first preset value, one RRU corresponds to first downlink RSRPs of a plurality of terminals, a first downlink RSRP, of one terminal, corresponding to one RRU is a received power that is estimated by the centralized controller, that is measured by the terminal, and that is of an RS sent by the RRU at a corresponding first RS transmit power, a first RS transmit power corresponding to one RRU is an RS transmit power obtained after power boosting is performed on a second RS transmit power corresponding to the RRU second RS transmit powers corresponding to the in RRUs are all preconfigured, the first preset value is a level value to be reached when the plurality of terminals perform a downlink service, and n is an integer greater than 0 and less than m.

The first preset value may be specifically a minimum level value to be reached when the plurality of terminals perform the downlink service. The first preset value may be configured by an operator, or may be determined by the centralized controller based on a requirement of the downlink service.

For example, referring to Table 1, it is assumed that there are six terminals, m=4, and $P_{dij}^1$ is a received power that is estimated by the centralized controller and that is of an RS that is sent by a $j^{th}$ RRU at a corresponding first RS transmit power and that is received by an $j^{th}$ terminal, that is, a first downlink RSRP, of the $i^{th}$ terminal, corresponding to the $j^{th}$ RRU, i is an integer greater than 0 and less than or equal to 6, and j is an integer greater than 0 and less than or equal to 4.

TABLE 1

| Terminal | RRU | | | |
| --- | --- | --- | --- | --- |
| | RRU 1 | RRU 2 | RRU 3 | RRU 4 |
| Terminal 1 | $P_{d11}^1$ | $P_{d12}^1$ | $P_{d13}^1$ | $P_{d14}^1$ |
| Terminal 2 | $P_{d21}^1$ | $P_{d22}^1$ | $P_{d23}^1$ | $P_{d24}^1$ |
| Terminal 3 | $P_{d31}^1$ | $P_{d32}^1$ | $P_{d33}^1$ | $P_{d34}^1$ |
| Terminal 4 | $P_{d41}^1$ | $P_{d42}^1$ | $P_{d43}^1$ | $P_{d44}^1$ |
| Terminal 5 | $P_{d51}^1$ | $P_{d52}^1$ | $P_{d53}^1$ | $P_{d54}^1$ |
| Terminal 6 | $P_{d61}^1$ | $P_{d62}^1$ | $P_{d63}^1$ | $P_{d64}^1$ |

Based on the example shown in Table 1, if a sum of $P_{di2}^1$, $P_{di2}^1$, and $P_{di4}^1$ is greater than or equal to the first preset value when i is 1, 2, 3, 4, 5, or 6, the n RRUs may be the RRU 2, the RRU 3, and the RRU 4.

When the sum of the first downlink RSRPs, of the same terminal, corresponding to the n RRUs is greater than or equal to the first preset value, a downlink coverage area of a cell may cover a location of the terminal. In this embodiment of this application, the downlink coverage area of the cell may cover locations of the plurality of terminals. In this embodiment of this application, each of the plurality of terminals is a sample, and a received power that is measured by each sample and that is of an RS may be sampled by the centralized controller in a non-energy-saving mode. Samples are determined randomly, and there may be dozens or hundreds of samples. Therefore, when the downlink coverage area of the cell can cover the locations of the plurality of terminals, it may be considered that downlink coverage of the cell satisfies a requirement. In descriptions of the "cell" in this embodiment of this application, when this application is applied to the scenario shown in FIG. 1, the cell is a cell of a BBU; and when this application is applied to the scenario shown in FIG. 2, the cell includes cells of m BBUs.

Second RS transmit powers corresponding to different RRUs may be the same or may be different, boosted transmit powers of the second RS transmit powers corresponding to different RRUs may be the same or may be different, and first RS transmit powers corresponding to different RRUs may be the same or may be different.

The method provided in this embodiment of this application may be performed when the communications system needs to enter an energy saving mode. To be specific, before step 401, the method may further include: The centralized controller determines to enter the energy saving mode.

Figure 1:
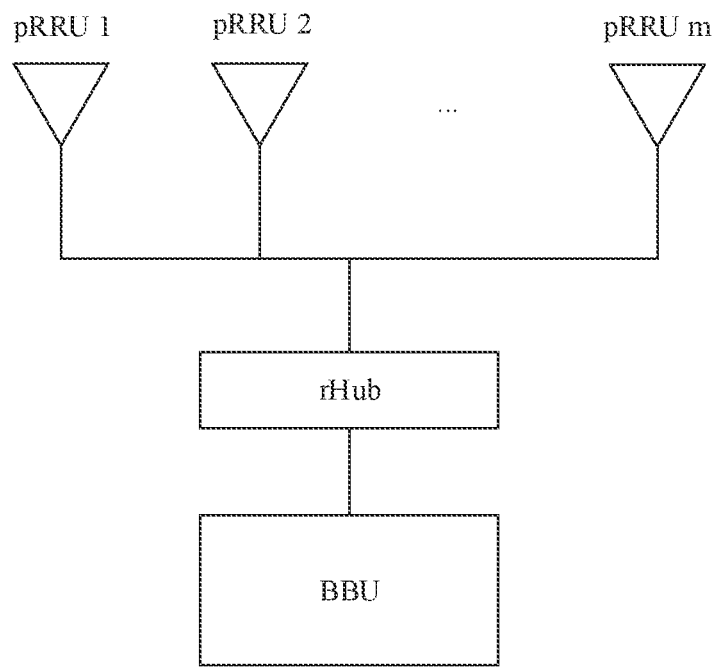
FIG. 1 is a schematic architectural diagram of a LampSite according to an embodiment of this application.

When this application is applied to the scenario shown in FIG. 1, the centralized controller is the BBU, and the BBU may periodically collect a load (or a quantity of users) of the cell of the BBU. When the load (or the quantity of users) is greater than a preset threshold, the BBU determines to enter the energy saving mode, and then performs step 401 and a subsequent method. The BBU may alternatively determine, at the beginning of a specified energy saving time, to enter the energy saving node. For example, if the energy saving time is from 22:00 to 8:00, the BBU determines, at 22:00, to enter the energy saving mode.

When this application is applied to the scenario shown in FIG. 2, the centralized controller may periodically collect a load (or a quantity of users) of each of the cells of the m BBUs. When the load (or the quantity of users) is greater than a preset threshold, the centralized controller determines to enter the energy saving mode, and then performs step 401 and a subsequent method. The centralized controller may alternatively determine, at the beginning of a specified energy saving time, to enter the energy saving mode. For example, if the energy saving time is from 22:00 to 8:00, the centralized controller determines, at 22:00, to enter the energy saving mode.

402: The centralized controller turns off an RRU that is in the m RRUs and that is different from the n RRUs.

A manner in which the centralized controller turns off one RRU may specifically include: turning off a carrier of the RRU, turning off a radio frequency channel of the RRU, turning off RS sending of the RRU, powering off the RRU, and the like.

403: The centralized controller boosts a second RS transmit power corresponding to each of the n RRUs to a corresponding first RS transmit power, and enables each of the n RRUs to send an RS at the corresponding first RS transmit power.

An execution sequence of step 402 and step 403 is not limited.

Figure 5:
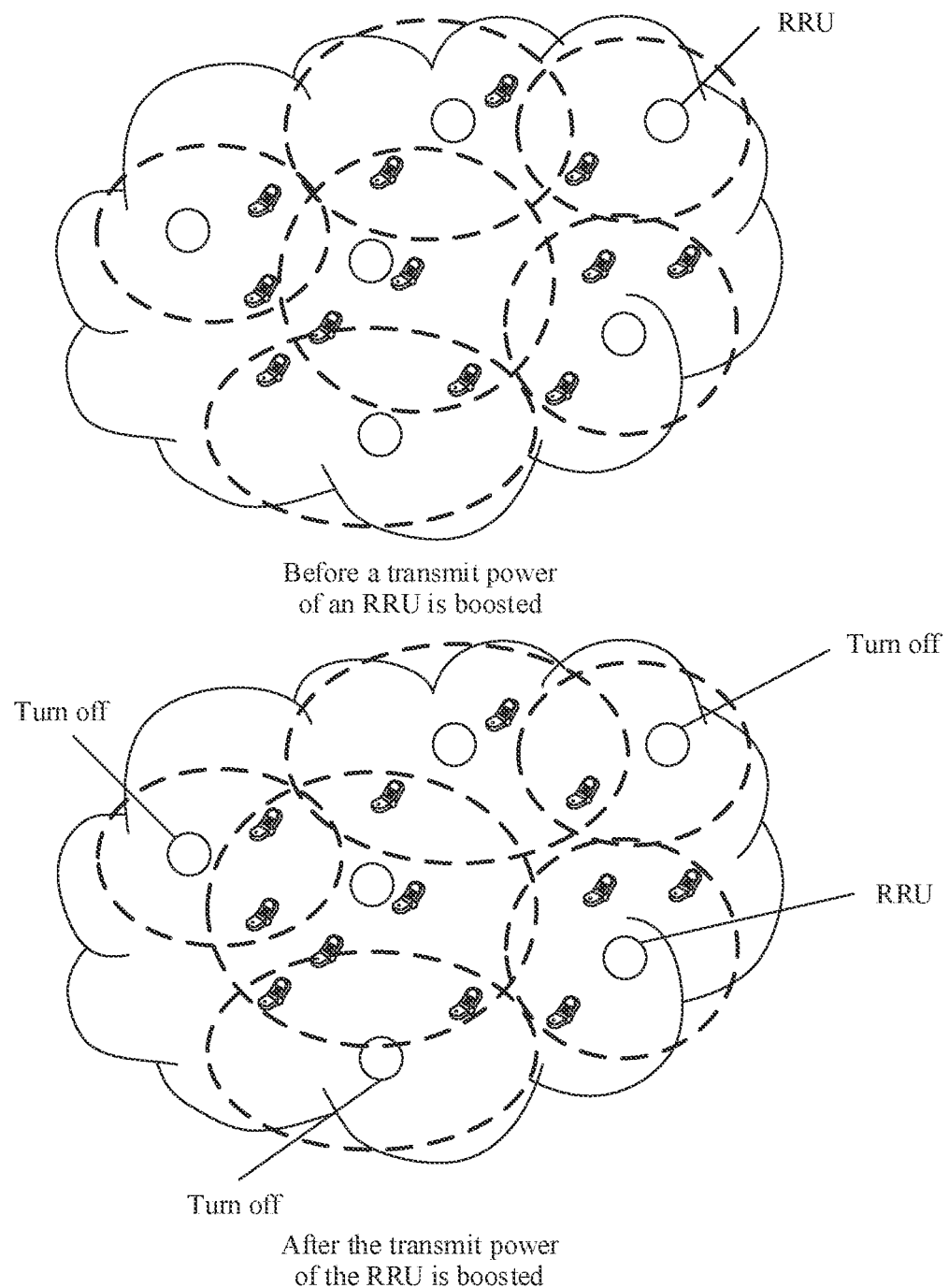
FIG. 5 is a schematic diagram of comparison between downlink coverage of a cell before and after an RS transmit power of an RRU is boosted according to an embodiment of this application.

It should be noted that, the downlink coverage of the cell depends on a value of a downlink RSRP of the cell. After the RS transmit power of the RRU is boosted, the value of the downlink RSRP of the cell increases. In this case, some RRUs in the m RRUs can satisfy a downlink coverage requirement of the cell, Therefore, other RRUs can be turned off, to reduce power consumption of the communications system. For example, referring to FIG. 5, all six RRUs need to be turned on to cover 12 terminals in the figure before RS transmit powers of the RRUs are boosted. Only three of the six RRUs are turned on to cover the 12 terminals in the figure after the RS transmit powers of the RRUs are boosted. Therefore, the other three RRUs may be turned off to reduce the power consumption of the communications system.

In a specific implementation of step 403, the RS transmit power of the RRU may be boosted in either of the following two manners:

Manner 1: The centralized controller reduces a data transmit power and increases the RS transmit power, to boost the second RS transmit power corresponding to each of the n RRUs to the corresponding first RS transmit power.

When this application is applied to the scenario shown in FIG. 1, the centralized controller may evenly allocate a reduced data transmit power to all RSs sent by the BBU, When this application is applied to the scenario shown in FIG. 2, the centralized controller may evenly allocate, to all RSs sent by each BBU, a reduced data transmit power on a service bandwidth of a logical cell of each BBU.

Figure 6:
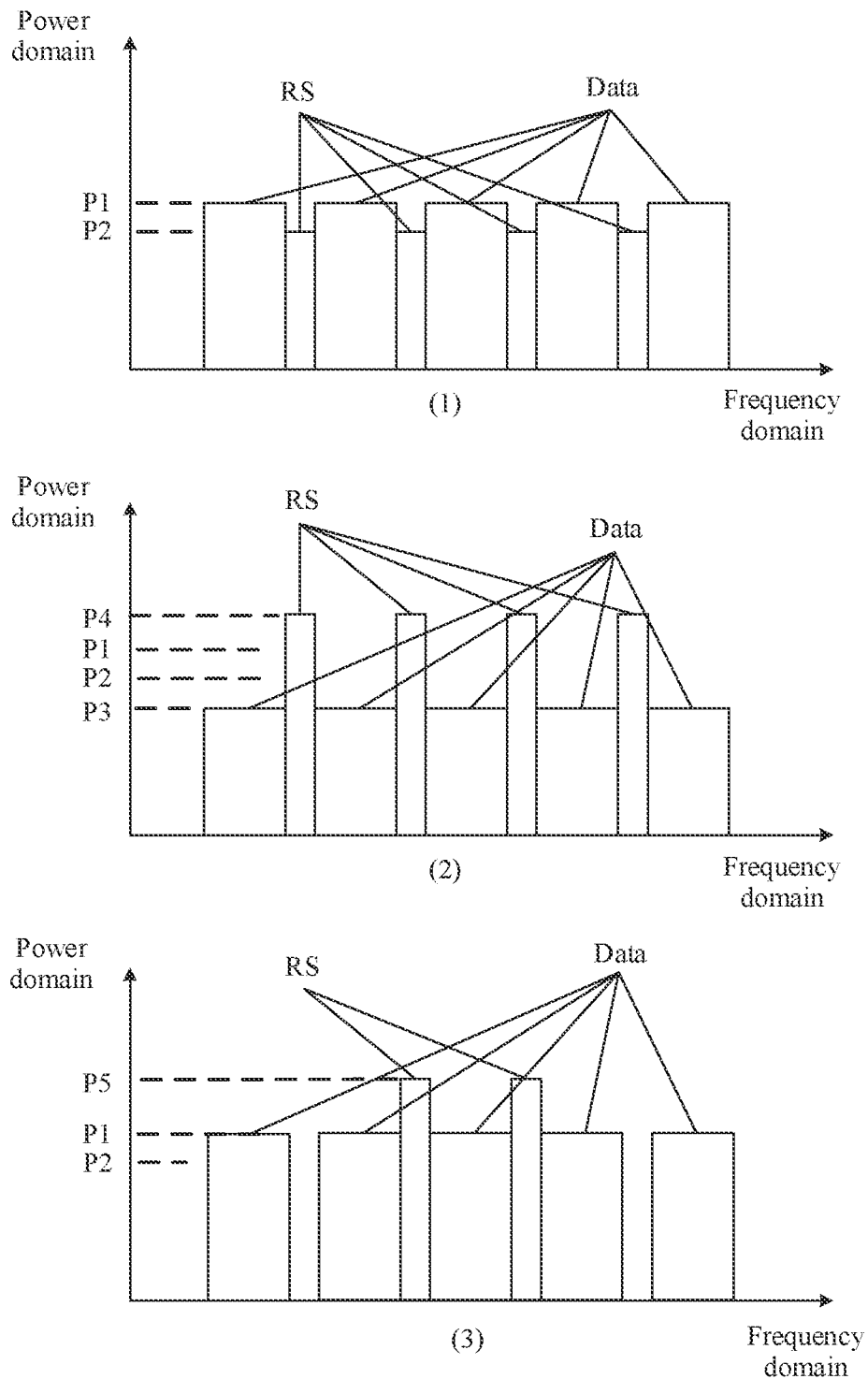
FIG. 6 is a schematic diagram of an effect of boosting an RS transmit power of an RRU according to an embodiment of this application.

For example, as shown in FIG. 6, in a normal case, the data transmit power and the RS transmit power are respectively P1 and P2. After processing in manner 1, the data transmit power changes to P3, and the RS transmit power changes to P4. P1 is greater than P3, and P2 is less than P4.

In the scenario shown in FIG. 1, the data transmit power is reduced, and a saved power is used to transmit the RS, so that the RS transmit power corresponding to each RRU may be boosted by about 3 dB.

Manner 2: The centralized controller concentrates a total RS transmit power on a service bandwidth of a logical cell to which the RRU belongs, to a bandwidth in a middle of the service bandwidth, to boost the second RS transmit power corresponding to each of the n RRUs to the corresponding first RS transmit power.

In a specific implementation of manner 2, the centralized controller determines, based on a boosted RS transmit power of each of then RRUs, the bandwidth in the middle corresponding to the n RRUs.

Specifically, the centralized controller may determine, according to formula 1, a quantity of resource elements (RE) used by one RRU to send an RS at a corresponding first RS transmit power, and then determine, based on locations of the REs in the service bandwidth, the bandwidth in the middle. Formula 1 is: Second RS transmit power×Quantity of REs for sending an RS—First RS transmit power× Quantity of REs for sending an RS.

For example, as shown in FIG. 6, in a normal case, the data transmit power and the RS transmit power are respectively P1 and P2. After processing in manner 2, the RS transmit power changes to P5, and P2 is less than P5.

In the scenario shown in FIG. 1, an actually used downlink bandwidth is reduced, the total RS transmit power is concentrated to the bandwidth in the middle of the service bandwidth, and no RS is sent on another bandwidth, so that the RS transmit power corresponding to each RRU may be boosted by about 6 dB to 9 dB.

In manner 2, optionally, the method further includes: The centralized controller sends scheduling information to the terminal, where the scheduling information includes a frequency domain resource used by the terminal to receive and/or send data, and the frequency domain resource is the bandwidth in the middle.

In the optional method, a base station may notify the terminal of information about the actually used bandwidth, and the terminal receives and/or sends the data on the bandwidth in the middle, to ensure correct transmission of the data.

The foregoing embodiment shows only examples of two methods for boosting the RS transmit power corresponding to the RRU. Actually, another method may be used to boost the RS transmit power corresponding to the RRU. For example, a data transmit power and/or an RS transmit power of a part of the service bandwidth of the logical cell to which the RRU belongs are/is used to boost an RS transmit power of another part of the bandwidth. The method for boosting the RS transmit power corresponding to the RRU is not specifically limited in this embodiment of this application.

According to the method provided in this embodiment of this application, the RS transmit power corresponding to the RRU is boosted, so that the n RRUs in the al RRUs can satisfy the downlink coverage requirement of the cell. Therefore, the RRU that is in the al RRUs and that is different from the n RRUs can be turned off, to reduce the power consumption of the communications system. According to the method provided in this embodiment of this application, the downlink coverage requirement of the cell is satisfied, and network key performance indicator (KPI) performance is also ensured. In addition, according to the method provided in this embodiment of this application, because the n RRUs can satisfy the downlink coverage requirement of the cell, each terminal can be detected.

In a specific implementation of step 401, the following steps may be included: (11) The centralized controller determines whether a sum of first downlink RSRPs, of each of the plurality of terminals, corresponding to any j RRUs in the in RRUs is greater than or equal to a first preset value; and (12) if yes, the centralized controller determines that the j RRUs are then RRUs; or (13) if not, the centralized controller assigns j=j1, and continues to determine whether a sum of first downlink RSRPs, of each of the plurality of terminals, corresponding to any j RRUs in the m RRUs is greater than or equal to the first preset value, until n RRUs are determined, where an initial value of j is a preset value, for example, when m=50, an initial value of j may be 30.

For example, referring to Table 1, if the j RRUs are the RRU 2, the RRU 3, and the RRU 4, a sum of first downlink RSRPs, of the j RRUs, corresponding to a terminal i of the six terminals is a sum of $P_{di2}^1$, $P_{di3}^1$, and $P_{di4}^1$. When i is 1, 2, 3, 4, 5, or 6, if the sum of $P_{di2}^1$, $P_{di3}^1$, and $P_{di4}^1$ is greater than or equal to the first preset value, the j RRUs may be the RRU 2, the RRU 3, and the RRU 4, and the n RRUs are the RRU 2, the RRU 3, and the RRU 4.

Optionally, before step 401, the method further includes: (21) The centralized controller determines second downlink RSRPs, of the plurality of terminals, corresponding to each of the m RRUs, and a second downlink RSRP, of one terminal, corresponding to one RRU is a received power that is measured by the terminal and that is of an RS sent by the RRU at a corresponding second RS transmit power; (22) the centralized controller determines a boosted RS transmit power of each of the m RRUs; and (23) the centralized controller determines first downlink RSRPs, of the plurality of terminals, corresponding to each of the m RRUs, based on the second downlink RSRPs, of the plurality of terminals, corresponding to each of the m RRUs and the boosted RS transmit power of each RRU.

In a specific implementation of step (22), the centralized controller may determine the boosted RS transmit power of the RRU based on the manner of boosting the RS transmit power of the RRU. One manner of boosting the RS transmit power may correspond to one value of the boosted RS transmit power. For example, if the RS transmit power of the RRU is boosted in the foregoing manner 1, the centralized controller determines that the value of the boosted RS transmit power of the RRU may be 3 dB. If the RS transmit power of the RRU is boosted in the foregoing manner 2, the centralized controller determines that the value of the boosted RS transmit power of the RRU may be 6 dB.

In a specific implementation of step (23), if a received power that is measured by one terminal and that is of an RS sent by one RRU at a corresponding second RS transmit power is A, and a boosted RS transmit power of the RRU is N, a received power that is estimated by the centralized controller, that is measured by the terminal, and that is of an RS sent by the RRU at a corresponding first RS transmit power is A+N, that is, a first downlink RSRP, of the terminal, corresponding to the RRU is A+N. The centralized controller may determine, according to the method, a first downlink RSRP, of each terminal, corresponding to each RRU.

The method provided in the foregoing embodiment may be performed once each time the centralized controller determines to enter the energy saving mode. The following method for determining the second downlink RSRPs, of the plurality of terminals, corresponding to each of the m RRUs does not need to be performed each time the energy saving mode is enabled, but may be performed once in a period of time, for example, a month or half a year.

When this application is applied to the scenario shown in FIG. 2, one terminal may autonomously measure received powers of RSs sent by the m RRUs at corresponding second RS transmit powers, and report the received powers to corresponding m BBUs, and then the in BBUs report the received powers to the centralized controller. Similarly, another terminal may also report, to the centralized controller, the measured received powers of the RSs sent by the in RRUs at the corresponding second RS transmit powers.

When this application is applied to the scenario shown in FIG. 1, optionally, in a specific implementation of step (21), the centralized controller determines a second downlink RSRP, of a first terminal, corresponding to a first RRU in the m RRUs, and the implementation may include the following steps: (31) The centralized controller measures uplink RSRPs, of the first terminal, corresponding to the m RRUs, where an uplink RSRP, of the first terminal, corresponding to one RRU is a received power that is measured by the centralized controller and that is of a sounding reference signal (SRS) sent by the first terminal through the RRU, and the first terminal is any one of the plurality of terminals; (32) the centralized controller receives information that is sent by the first terminal and that is about a sum of second downlink RSRPs, of the first terminal, corresponding to the m RRUs; and (33) the centralized controller determines the second downlink RSRP, of the first terminal, corresponding to the first RRU, based on the uplink RSRPs, of the first terminal, corresponding to the m RRUs and the information about the sum of the second downlink RSRPs, of the first terminal, corresponding to the in RRUs, where the first RRU is any one of the m RRUs.

The SRS sent by the terminal may be an SRS in an SRS resource configured by the BBU for the terminal after the terminal accesses the logical cell of the BBU. After receiving the SRS resource, the terminal periodically sends SRSs in the SRS resource.

It should be noted that, one uplink subframe includes 14 symbols, first 13 symbols are used to send data, and the last symbol is used to send the SRS, Therefore, the first 13 symbols may be referred to as data symbols, and the last symbol may be referred to as an SRS symbol. In a specific implementation of step (31), the BBU may control one terminal to send the SRS in the SRS symbol. The in RRUs do not combine, and only one RRU performs uplink transmission, that is, in the SRS symbol, only one RRU is turned on and other RRUs are turned off. In this way, an uplink RSRP of the SRS sent by the terminal through the RRU is measured on the RRU. In a specific implementation, the centralized controller may turn on the RRUs in the in RRUs in turn, to obtain an uplink RSRP, of the terminal, corresponding to each of the in RRUs. For example, only the first RRU in the m RRUs is turned on in an uplink subframe 1, to obtain an uplink RSRP, of the terminal, corresponding to the first RRU. Only a second RRU in the m RRUs is turned on in an uplink subframe 2, to obtain an uplink RSRP, of the terminal, corresponding to the second RRU.

It should be noted that, the m RRUs may still combine to transmit the data in the data symbols.

For example, referring to Table 2, it is assumed that there are six terminals and m=4, uplink RSRPs that are measured by the centralized controller, that are of the terminal 1. the terminal 2, the terminal 3, the terminal 4, the terminal 5, and the terminal 6 and that corresponds to an RRU i are respectively $P_{u1i}$, $P_{u2i}$, $P_{u3i}$, $P_{u4i}$, $P_{u5i}$, and $P_{u6i}$.

TABLE 2

| Terminal | RRU 1 | RRU 2 | RRU 3 | RRU 4 |
|---|---|---|---|---|
| | | RRU | | |
| Terminal 1 | $P_{u11}$ | $P_{u12}$ | $P_{u13}$ | $P_{u14}$ |
| Terminal 2 | $P_{u21}$ | $P_{u22}$ | $P_{u23}$ | $P_{u24}$ |
| Terminal 3 | $P_{u31}$ | $P_{u32}$ | $P_{u33}$ | $P_{u34}$ |
| Terminal 4 | $P_{u41}$ | $P_{u42}$ | $P_{u43}$ | $P_{u44}$ |
| Terminal 5 | $P_{u51}$ | $P_{u52}$ | $P_{u53}$ | $P_{u54}$ |
| Terminal 6 | $P_{u61}$ | $P_{u62}$ | $P_{u63}$ | $P_{u64}$ |

Note: $P_{uij}$ is a received power that is measured by the centralized controller and that is of an SRS sent by an $i^{th}$ terminal through a $j^{th}$ RRU.

In a specific implementation of step (32), the centralized controller controls each terminal to measure and report a downlink RSRP of the cell. The information about a sum of second downlink RSRPs, of one terminal, corresponding to the in RRUs may be included in a measurement report (MR) of the terminal. It should be noted that, when this application is applied to the scenario shown in FIG. 1, because the in RRUs combine to send an RS, a downlink RSRP directly measured by the terminal is the sum of the second downlink RSRPs, of the terminal, corresponding to the m RRUs.

For example, referring to Table 3, it is assumed that there are six terminals and m=4, and $P_{dij}^2$ is a received power of an RS that is sent by a $j^{th}$ RRU at a corresponding second RS transmit power and that is received by an $i^{th}$ terminal, that is, a second downlink RSRP, of the $i^{th}$ terminal, corresponding to the $j^{th}$ RRU.

TABLE 3

| Terminal | RRU 1 | RRU 2 | RRU 3 | RRU 4 |
|---|---|---|---|---|
| | | RRU | | |
| Terminal 1 | $P_{d11}^2$ | $P_{d12}^2$ | $P_{d13}^2$ | $P_{d14}^2$ |
| Terminal 2 | $P_{d21}^2$ | $P_{d22}^2$ | $P_{d23}^2$ | $P_{d24}^2$ |
| Terminal 3 | $P_{d31}^2$ | $P_{d32}^2$ | $P_{d33}^2$ | $P_{d34}^2$ |
| Terminal 4 | $P_{d41}^2$ | $P_{d42}^2$ | $P_{d43}^2$ | $P_{d44}^2$ |
| Terminal 5 | $P_{d51}^2$ | $P_{d52}^2$ | $P_{d53}^2$ | $P_{d54}^2$ |
| Terminal 6 | $P_{d61}^2$ | $P_{d62}^2$ | $P_{d63}^2$ | $P_{d64}^2$ |

In a specific implementation of step (33), the following steps may be included: (41) The centralized controller determines, based on a preset algorithm, a linear value of the second downlink RSRP, of the first terminal, corresponding to the first RRU, where the preset algorithm is $$\frac{S_{uplink\_RSRP}}{RSRP1'} = \frac{S_{downlink\_RSRP}}{RSRP1},$$

$S_{uplink\_RSRP}$ is a sum of linear values of the uplink RSRPs, of the first terminal, corresponding to the in RRUs, $S_{downlink\_RSRP}$ is a sum of linear values of the second downlink RSRPs, of the first terminal, corresponding to the in RRUs, RSRP1' is a linear value of an uplink RSRP, of the first terminal, corresponding to the first RRU, and RSRP1 is the linear value of the second downlink RSRP, of the first terminal, corresponding to the first RRU; and (42) the centralized controller determines the second downlink RSRP, of the first terminal, corresponding to the first RRU, based on the linear value of the second downlink RSRP, of the first terminal, corresponding to the first RRU.

In a specific implementation of step (42), the following step may be included: The centralized controller calculates the second downlink RSRP, of the first terminal, corresponding to the first RRU, according to formula 2 and based on the linear value of the second downlink RSRP, of the first terminal, corresponding to the first RRU, where formula 2 is: The second downlink RSRP, of the first terminal, corresponding to the first RRU=10 $\log_{10}$ (the linear value of the second downlink RSRP, of the first terminal, corresponding to the first RRU).

It should be noted that, this application describes an example of a process in which the centralized controller determines the second downlink RSRP, of the first terminal, corresponding to the first RRU. Actually, the process may be used to determine a second downlink RSRP, of each terminal, corresponding to each RRU.

To ensure accuracy of calculation, a time interval between a time at which the centralized controller measures uplink RSRPs, of the plurality of terminals, corresponding to each of the m RRUs, and a time at which the centralized controller receives information that is sent by each of the plurality of terminals and that is about a. sum of second downlink RSRPs, of each of the plurality of terminals, corresponding to the m RRUs is very small. Alternatively, a process in which the centralized controller receives the information that is sent by the plurality of terminals and that is about the sum of the second downlink RSRPs, of each of the plurality of terminals, corresponding to the m RRUs is in a process in which the centralized controller measures the uplink RSRPs, of the plurality of terminals, corresponding to each of the m RRUs.

The following specifically describes derivation of the preset algorithm. Parameters in the derivation process all corresponding to one terminal. First, the parameters used in the derivation process are described in detail: RSRPj is a received power that is measured by the terminal and that is of an RS sent by a $j^{th}$ RRU in the m RRUs at a corresponding second RS transmit power, where j is an integer greater than 0 and less than or equal to m; RSRPj' is a received. power that is measured by the centralized controller and that is of an SRS sent by the terminal through the $j^{th}$ RRU in the m RRUs; H is an uplink/downlink transmission loss caused by a difference between uplink and downlink frequency bands; L_RSRPj is a linear value of RSRPj, where L_RSRPj= $(RSRPj/10)^{10}$; and L_RSRPj' is a linear value of RSRPj', where L_RSRPj'=$(RSRPj/10)^{10}$.

The derivation process is as follows:

According to uplink and downlink reciprocity and a fixed difference, the following equations can be obtained:

$$RSRP1 = RSRP1' + H \quad (1)$$

$$RSRP2 = RSRP2' + H \quad (2)$$

Expressions (1) and (2) can be changed to the following:

$$RSRP2 - RSRP1 = RSRP2' - RSRP1' \quad (3)$$

The following expression can be obtained by converting the expression (3) into a linear value:

$$L\_RSRP2/L\_RSRP1 = L\_RSRP2'/L\_RSRP1'$$

Similarly, the following expressions can be obtained:

$$L\_RSRP3/L\_RSRP1 = L\_RSRP3'/L\_RSRP1';$$

...

$$L\_RSRPm/L\_RSRP1 = L\_RSRPm'/L\_RSRP1'.$$

In this way, (L_RSRP1+L_RSRP2+ . . . +L_RSRPm)/ L_RSRP1=(L_RSRP1'+L_RSRP2'+ . . . +L_RSRPm')/ L_RSRP1'.

The following expression can be further obtained: (L_RSRP1+L_RSRP2+ . . . +L_RSRPm)/L_RSRPj= (L_RSRP1'+L_RSRP2'+ . . . +L_RSRPm')/L_RSRPj'.

Figure 7:
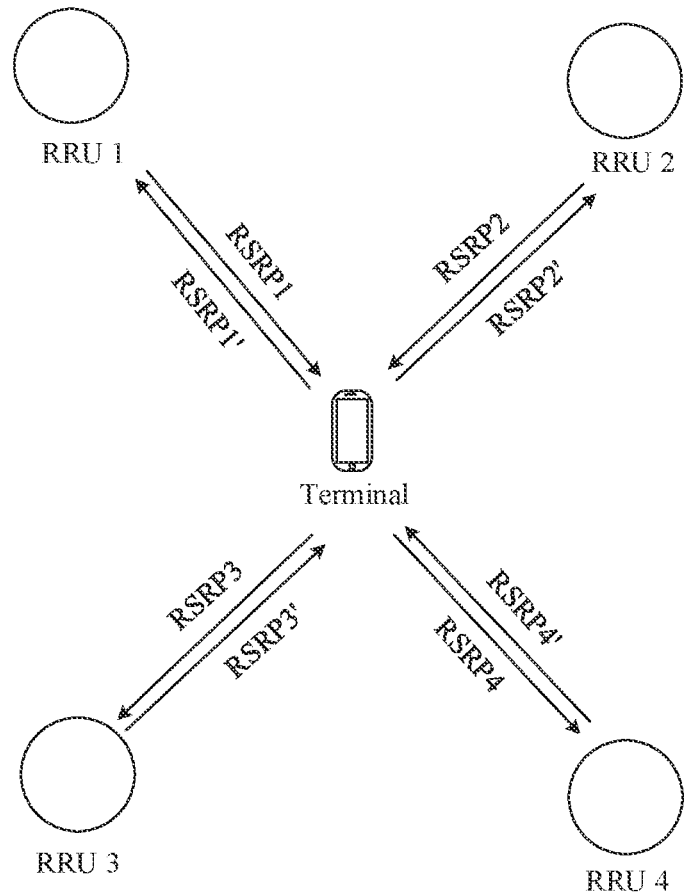
FIG. 7 is a schematic diagram of received powers of uplink and downlink RSs according to an embodiment of this application.

For example, referring to FIG. 7, if m=4, and calculation of a received power of an RS that is sent by an RRU 1 and that is received by the terminal is used as an example. (L_RSRP1+L_RSRP2+L_RSRP3+L_RSRP4)/L_RSRP1= (L_RSRP1'+L_RSRP2'+L_RSRP3'+L_RSRP4')/ L_RSRP1'. A value of L_RSRP1+L_RSRP2+L_RSRP3+ L_RSRP4 may be measured by the terminal and fed back to the centralized controller. L_RSRP1', L_RSRP2', L_RSRP3', and L_RSRP4' may be obtained by the centralized controller through measurement, The centralized controller may obtain L_RSRP1 through calculation according to the formula, and further obtain RSRP1.

The foregoing mainly describes the solutions in the embodiments of this application from a perspective of the method. It may be understood that, to implement the foregoing functions, the energy saving apparatus includes a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods for implementing the described functions for each particular application, but it should not be considered that the implementation goes beyond the scope of this application.

In the embodiments of this application, functional unit division may be performed on the energy saving apparatus based on the example of the method. For example, functional units may be divided based on corresponding functions, or two or more than two functions may be integrated into one processing unit. The integrated unit may be implemented in a form of hardware, or may be implemented in a form of a software functional unit. It should be noted that, in the embodiments of this application, division into units is an example and is merely logical function division. In actual implementation, another division manner may be used.

Figure 8:
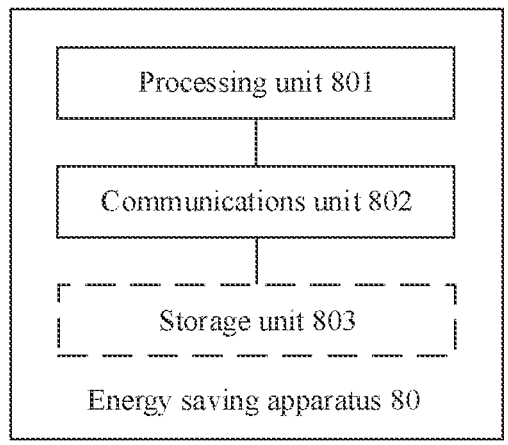
FIG. 8 is a schematic composition diagram of an energy saving apparatus according to an embodiment of this application.

For example, when an integrated function module is used, FIG. 8 is a possible schematic structural diagram of an energy saving apparatus 80 in the foregoing embodiments. Referring to FIG. 8, the apparatus 80 may include: a processing unit 801 and a communications unit 802, and may further include a storage unit 803.

The processing unit 801 is configured to control and manage an action of the energy saving apparatus. For example, the processing unit 801 is configured to support the energy saving apparatus in performing the steps in FIG. 4, and/or an action performed by the energy saving apparatus in another process described in the embodiments of this application. The communications unit 802 is configured to support the energy saving apparatus in communicating with another network device, for example, communicating with a terminal through an RRU. The storage unit 803 is configured to store program code and data of the energy saving apparatus.

The processing unit 801 may be a processor or a controller, the communications unit 802 may be a communications interface, and the storage unit 803 may be a memory. When the processing unit 801 is a processor, the communications unit 802 is a communications interface, and the storage unit 803 is a memory, the apparatus in this embodiment of this application may be the apparatus shown in FIG. 3.

The processor 301 is configured to control and manage an action of the energy saving apparatus. For example, the processor 301 is configured to support the energy saving apparatus in performing the steps in FIG. 4, and/or an action performed by the energy saving apparatus in another process described in the embodiments of this application. The communications interface 304 is configured to support the energy saving apparatus in communicating with another network device, for example, communicating with a terminal through an RRU. The memory 303 is configured to store program code and data of the enemy saving apparatus.

An embodiment of this application further provides a computer-readable storage medium, including an instruction. When the instruction is run on a computer, the computer is enabled to perform the foregoing method.

An embodiment of this application further provides a computer program product including an instruction. When the computer program product runs on a computer, the computer is enabled to perform the foregoing method.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer program instruction is loaded and executed on the computer, all or some of the procedures or functions according to the embodiments of this application are generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and the accompanying drawings are merely example descriptions of this application defined by the appended claims, and are considered as any of or all modifications, variations, combinations or equivalents that cover the scope of this application.

What is claimed is:

1. An energy saving method, applied to a communications system, wherein the communications system comprises a centralized controller and m radio remote units (RRUs) connected to the centralized controller, wherein m is an integer greater than 1, and wherein the energy saving method comprises:
determining, by the centralized controller, n RRUs in the m RRUs, wherein a sum of first downlink reference signal received powers (RSRPs) of a same terminal, corresponding to the n RRUs, is greater than or equal to a first preset value, wherein one RRU corresponds to first downlink RSRPs of a plurality of terminals, wherein a first downlink RSRP of one terminal corresponding to one RRU is a received power that is estimated by the centralized controller, that is measured by the terminal, and that is of a reference signal (RS) from the RRU at a corresponding first RS transmit power, wherein a first RS transmit power corresponding to one RRU is an RS transmit power obtained after power boosting is performed on a second RS transmit power corresponding to the RRU, wherein second RS transmit powers corresponding to the m RRUs are all preconfigured, wherein the first preset value is a level value to be reached when the plurality of terminals perform a downlink service, and wherein n is an integer greater than 0 and less than m; and
in response to determining the n RRUs in the m RRUs:
turning off, by the centralized controller, an RRU that is in the m RRUs and that is different from the n RRUs; and
boosting, by the centralized controller, a second RS transmit power corresponding to each of the n RRUs to a corresponding first RS transmit power, and enabling each of the n RRUs to send an RS at the corresponding first RS transmit power.

2. The energy saving method according to claim 1, wherein the boosting, by the centralized controller, a second RS transmit power corresponding to each of the n RRUs to a corresponding first RS transmit power comprises:
reducing, by the centralized controller, data transmit power, and increasing RS transmit power to boost the second RS transmit power corresponding to each of the n RRUs to the corresponding first RS transmit power; or
concentrating, by the centralized controller, a total RS transmit power on a service bandwidth of a logical cell to which the RRU belongs to a bandwidth in a middle of the service bandwidth to boost the second RS transmit power corresponding to each of the n RRUs to the corresponding first RS transmit power.

3. The energy saving method according to claim 1, wherein before the determining, by the centralized controller, n RRUs in the m RRUs, the energy saving method further comprises:
determining, by the centralized controller, second downlink RSRPs of the plurality of terminals corresponding to each of the m RRUs, wherein a second downlink RSRP of one terminal corresponding to one RRU is a received power that is measured by the terminal and that is of an RS from the RRU at a corresponding second RS transmit power;
determining, by the centralized controller, a boosted RS transmit power of each of the m RRUs; and
determining, by the centralized controller, first downlink RSRPs of the plurality of terminals corresponding to each of the m RRUs based on the second downlink RSRPs of the plurality of terminals corresponding to each of the m RRUs and the boosted RS transmit power of each RRU.

4. The energy saving method according to claim 2, wherein before the concentrating, by the centralized controller, a total RS transmit power on a service bandwidth of a logical cell to which the RRU belongs to a bandwidth in a middle of the service bandwidth to boost the second RS transmit power corresponding to each of the n RRUs to the corresponding first RS transmit power, the energy saving method further comprises:
  determining, by the centralized controller based on a boosted RS transmit power of each of the n RRUs, the bandwidth in the middle corresponding to the n RRUs.

5. The energy saving method according to claim 3, wherein that the centralized controller determines a second downlink RSRP of a first terminal corresponding to a first RRU in the m RRUs comprises:
  measuring, by the centralized controller, uplink RSRPs of the first terminal corresponding to the m RRUs, wherein an uplink RSRP of the first terminal corresponding to one RRU is a received power that is measured by the centralized controller and that is of a sounding reference signal (SRS) from the first terminal through the RRU, and wherein the first terminal is any one of the plurality of terminals;
  receiving, by the centralized controller, information that is from the first terminal and that is about a sum of second downlink RSRPs of the first terminal corresponding to the m RRUs; and
  determining, by the centralized controller, the second downlink RSRP of the first terminal corresponding to the first RRU based on the uplink RSRPs of the first terminal corresponding to the m RRUs and the information about the sum of the second downlink RSRPs of the first terminal corresponding to the m RRUs, wherein the first RRU is any one of the m RRUs.

6. The energy saving method according to claim 5, wherein the determining, by the centralized controller, the second downlink RSRP of the first terminal corresponding to the first RRU based on the uplink RSRPs of the first terminal corresponding to the m RRUs and the information about the sum of the second downlink RSRPs of the first terminal corresponding to the m RRUs comprises:
  determining, by the centralized controller based on a preset algorithm, a linear value of the second downlink RSRP of the first terminal corresponding to the first RRU, wherein the preset algorithm is $$\frac{S_{uplink\ RSRP}}{RSRP1'} = \frac{S_{downlink\ RSRP}}{RSRP1},$$

wherein $S_{uplink\ RSRP}$ is a sum of linear values of the uplink RSRPs of the first terminal corresponding to the m RRUs, wherein $S_{downlink\ RSRP}$ is a sum of linear values of the second downlink RSRPs of the first terminal corresponding to the m RRUs, wherein RSRP1' is a linear value of an uplink RSRP of the first terminal corresponding to the first RRU, and wherein RSRP1 is the linear value of the second downlink RSRP of the first terminal corresponding to the first RRU; and
  determining, by the centralized controller, the second downlink RSRP of the first terminal corresponding to the first RRU based on the linear value of the second downlink RSRP of the first terminal corresponding to the first RRU.

7. The energy saving method according to claim 1, wherein the determining, by the centralized controller, n RRUs in the m RRUs comprises:
  determining, by the centralized controller, whether a sum of first downlink RSRPs of each of the plurality of terminals corresponding to any j RRUs in the m RRUs is greater than or equal to the first preset value; and if the sum of the first downlink RSRPs of each of the plurality of terminals corresponding to the j RRUs in the m RRUs is greater than or equal to the first preset value, determining, by the centralized controller, the j RRUs as the n RRUs; or
if the sum of the first downlink RSRPs of each of the plurality of terminals corresponding to the j RRUs in the m RRUs is less than the first preset value, assigning, by the centralized controller, j=j+1, and continuing to determine whether a sum of first downlink RSRPs of each of the plurality of terminals corresponding to any j RRUs in the m RRUs is greater than or equal to the first preset value, until the n RRUs are determined, wherein an initial value of j is a preset value.

8. The energy saving method according to claim 1, wherein before the determining, by the centralized controller, n RRUs in the m RRUs, the energy saving method further comprises:
  determining, by the centralized controller, that the communications system is to enter an energy saving mode.

9. An energy saving apparatus, comprising:
  at least one processor; and
  a memory coupled to the at least one processor and storing executable instructions for execution by the at least one processor to:
    determine n radio remote units (RRUs) in m RRUs, wherein a sum of first downlink reference signal received powers (RSRPs) of a same terminal, corresponding to the n RRUs, is greater than or equal to a first preset value, wherein one RRU corresponds to first downlink RSRPs of a plurality of terminals, wherein a first downlink RSRP of one terminal corresponding to one RRU is a received power that is estimated by the processor, that is measured by the terminal, and that is of a reference signal (RS) from the RRU at a corresponding first RS transmit power, wherein a first RS transmit power corresponding to one RRU is an RS transmit power obtained after power boosting is performed on a second RS transmit power corresponding to the RRU, wherein second RS transmit powers corresponding to the m RRUs are all preconfigured, wherein the first preset value is a level value to be reached when the plurality of terminals perform a downlink service, and wherein n is an integer greater than 0 and less than m; and
    in response to determining the n RRUs in the m RRUs:
      turn off an RRU that is in the m RRUs and that is different from the n RRUs; and
      boost a second RS transmit power corresponding to each of the n RRUs to a corresponding first RS transmit power, and enabling each of the n RRUs to send an RS at the corresponding first RS transmit power.

10. The energy saving apparatus according to claim 9, wherein the executable instructions are for execution by the at least one processor to:
  reduce data transmit power, and increase RS transmit power to boost the second RS transmit power corresponding to each of the n RRUs to the corresponding first RS transmit power; or
  concentrate a total RS transmit power on a service bandwidth of a logical cell to which the RRU belongs to a bandwidth in a middle of the service bandwidth to boost the second RS transmit power corresponding to each of the n RRUs to the corresponding first RS transmit power.

11. The energy saving apparatus according to claim 9, wherein the executable instructions are for execution by the at least one processor to:
- determine second downlink RSRPs of the plurality of terminals corresponding to each of the m RRUs, wherein a second downlink RSRP of one terminal corresponding to one RRU is a received power that is measured by the terminal and that is of an RS from the RRU at a corresponding second RS transmit power;
- determine a boosted RS transmit power of each of the m RRUs; and
- determine first downlink RSRPs, of the plurality of terminals corresponding to each of the m RRUs based on the second downlink RSRPs of the plurality of terminals corresponding to each of the m RRUs and the boosted RS transmit power of each RRU.

12. The energy saving apparatus according to claim 10, wherein the executable instructions are for execution by the at least one processor to:
- determine, based on a boosted RS transmit power of each of the n RRUs, the bandwidth in the middle corresponding to the n RRUs.

13. The energy saving apparatus according to claim 11, wherein the executable instructions are for execution by the at least one processor to:
- measure uplink RSRPs of a first terminal corresponding to the m RRUs, wherein an uplink RSRP of the first terminal corresponding to one RRU is a received power that is measured by the processor and that is of a sounding reference signal (SRS) from the first terminal through the RRU, and wherein the first terminal is any one of the plurality of terminals;
- receive information that is from the first terminal and that is about a sum of second downlink RSRPs of the first terminal corresponding to the m RRUs; and
- determine a second downlink RSRP of the first terminal corresponding to a first RRU based on the uplink RSRPs of the first terminal corresponding to the m RRUs and the information about the sum of the second downlink RSRPs of the first terminal corresponding to the m RRUs, wherein the first RRU is any one of the m RRUs.

14. The energy saving apparatus according to claim 13, wherein the executable instructions are for execution by the at least one processor to:
- determine based on a preset algorithm, a linear value of the second downlink RSRP of the first terminal corresponding to the first RRU, wherein the preset algorithm is $$\frac{S_{uplink\ RSRP}}{RSRP1'} = \frac{S_{downlink\ RSRP}}{RSRP1},$$

wherein $S_{uplink\ RSRP}$ is a sum of linear values of the uplink RSRPs of the first terminal corresponding to the m RRUs, wherein $S_{downlink\ RSRP}$ is a sum of linear values of the second downlink RSRPs of the first terminal corresponding to the m RRUs, wherein RSRP1' is a linear value of an uplink RSRP of the first terminal corresponding to the first RRU, and wherein RSRP1 is the linear value of the second downlink RSRP of the first terminal corresponding to the first RRU; and
- determine the second downlink RSRP of the first terminal corresponding to the first RRU based on the linear value of the second downlink RSRP of the first terminal corresponding to the first RRU.

15. The energy saving apparatus according to claim 9, wherein the executable instructions are for execution by the at least one processor to:
- determine whether a sum of first downlink RSRPs of each of the plurality of terminals corresponding to any j RRUs in the m RRUs is greater than or equal to the first preset value; and
- if the sum of the first downlink RSRPs of each of the plurality of terminals corresponding to the j RRUs in the m RRUs is greater than or equal to the first preset value, determine the j RRUs as the n RRUs; or
- if the sum of the first downlink RSRPs of each of the plurality of terminals corresponding to the j RRUs in the m RRUs is less than the first preset value, assign j=j+1, and continue to determine whether a sum of first downlink RSRPs of each of the plurality of terminals corresponding to any j RRUs in the m RRUs is greater than or equal to the first preset value, until the n RRUs are determined, wherein an initial value of j is a preset value.

16. The energy saving apparatus according to claim 9, wherein the executable instructions are for execution by the at least one processor to:
- determine that the energy saving apparatus is to enter an energy saving mode.

17. A non-transitory computer-readable storage medium, comprising an instruction for execution by a computer to:
- determine n radio remote units (RRUs) in m RRUs, wherein a sum of first downlink reference signal received powers (RSRPs) of a same terminal, corresponding to the n RRUs, is greater than or equal to a first preset value, wherein one RRU corresponds to first downlink RSRPs of a plurality of terminals, wherein a first downlink RSRP, of one terminal, corresponding to one RRU is a received power that is estimated by the computer, that is measured by the terminal, and that is of a reference signal (RS) from the RRU at a corresponding first RS transmit power, wherein a first RS transmit power corresponding to one RRU is an RS transmit power obtained after power boosting is performed on a second RS transmit power corresponding to the RRU, wherein second RS transmit powers corresponding to the m RRUs are all preconfigured, wherein the first preset value is a level value to be reached when the plurality of terminals perform a downlink service, and wherein n is an integer greater than 0 and less than m; and
- in response to determining the n RRUs in the m RRUs:
  - turn off an RRU that is in the m RRUs and that is different from the n RRUs; and
  - boost a second RS transmit power corresponding to each of the n RRUs to a corresponding first RS transmit power, and enabling each of the n RRUs to send an RS at the corresponding first RS transmit power.

18. The non-transitory computer-readable storage medium according to claim 17, wherein the instruction is for execution by the computer to:
- reduce data transmit power, and increase RS transmit power to boost the second RS transmit power corresponding to each of the n RRUs to the corresponding first RS transmit power; or
- concentrate a total RS transmit power on a service bandwidth of a logical cell to which the RRU belongs to a bandwidth in a middle of the service bandwidth to boost the second RS transmit power corresponding to each of the n RRUs to the corresponding first RS transmit power.

19. The non-transitory computer-readable storage medium according to claim 18, wherein the instruction is for execution by the computer to:

determine, based on a boosted RS transmit power of each of the n RRUs, the bandwidth in the middle corresponding to the n RRUs.

20. The non-transitory computer-readable storage medium according to claim 17, wherein the instruction is for execution by the computer to:

determine that the computer is to enter an energy saving mode.

\* \* \* \* \*

UNITED STATES PATENT AND TRADEMARK OFFICE
CERTIFICATE OF CORRECTION

PATENT NO. : 11,606,747 B2
APPLICATION NO. : 17/156987
DATED : March 14, 2023
INVENTOR(S) : Jindong Peng and Wei Zhang It is certified that error appears in the above-identified patent and that said Letters Patent is hereby corrected as shown below:

In the Claims

In Column 21, In Line 59, In Claim 14, delete "$S_{downlink\ RSRP}is$" and insert -- $S_{downlink\ RSRP}$ is --.

Signed and Sealed this
Seventeenth Day of October, 2023

Katherine Kelly Vidal
*Director of the United States Patent and Trademark Office*